(12) United States Patent
Beugnot et al.

(10) Patent No.: US 6,225,605 B1
(45) Date of Patent: May 1, 2001

(54) ELECTRICAL COOKING APPLIANCE WITH REMOVABLE BOWL

(75) Inventors: Bernard Beugnot, Is sur Tille; Dominique Federico, Chevigny Saint Sauveur; Laurent Sestier, Selongey, all of (FR)

(73) Assignee: SEB S.A., Fcully (FR)

( * ) Notice: Subject to any disclaimer, the term of this patent is extended or adjusted under 35 U.S.C. 154(b) by 0 days.

(21) Appl. No.: 09/485,858
(22) PCT Filed: Jun. 15, 1999
(86) PCT No.: PCT/FR99/01432
    § 371 Date: Feb. 17, 2000
    § 102(e) Date: Feb. 17, 2000
(87) PCT Pub. No.: WO99/65374
    PCT Pub. Date: Dec. 23, 1999

(30) Foreign Application Priority Data

Jun. 17, 1998  (FR) .................................................. 98 07868

(51) Int. Cl.[7] .............................. H05B 3/06; H05B 3/68; A47J 36/34
(52) U.S. Cl. .......................... 219/432; 219/436; 219/541; 219/435
(58) Field of Search .................................... 219/432, 435, 219/436, 541

(56) References Cited

U.S. PATENT DOCUMENTS

| 2,269,689 | * | 1/1942 | Reichold | 215/435 |
| 2,543,052 | * | 2/1951 | Park | 219/435 |
| 4,713,522 | | 12/1987 | Kimura . | |

FOREIGN PATENT DOCUMENTS

| 197 14 038 | * | 10/1998 | (DE) . |
| 587 300 | | 3/1994 | (EP) . |
| 80 01535 | | 8/1980 | (WO) . |

* cited by examiner

*Primary Examiner*—Joseph Pelham
(74) *Attorney, Agent, or Firm*—Browdy and Neimark

(57) ABSTRACT

Electrical cooking appliance, notably a fryer, having a case (1) forming a housing (2) provided to receive a removable bowl (3), the bowl having lateral walls (4) and a base (5) under which is fixed a shielded heating element (6) having two extremities (7) each terminated by a connection terminal (8). An electric connector (10) is mounted in the case (1), the connector having electrical contacts (12) disposed opposite openings (11) provided to receive the terminals (8) of the shielded heating element (6), during introduction of the bowl (3) into the housing (2). The connector (10) is mounted to be movable in lateral translation relative to the base of the case (1) and the openings (11) have bevel edges (13) provided to guide the terminals (8) of the heating element (6) toward the electrical contacts (12).

13 Claims, 3 Drawing Sheets

ELECTRICAL COOKING APPLIANCE WITH REMOVABLE BOWL

The present application is the national stage under 35 U.S.C. §371 of international application PCT/FR99/01432, filed Jun. 15. 1999, which designated the United States, which international application was published under PCT Article 21(2) in English.

TECHNICAL FIELD

The present invention relates to an electrical cooking appliance having a removable bowl comprising a shielded heating element fixed under the lower face of said bowl.

PRIOR ART

It is known from the document EP 0 587 300 to provide a fryer with a removable bowl composed of a case forming a housing provided to receive a removable bowl. The removable bowl includes a heating element fixed under the base of said bowl, the terminals of said heating element being capable of being connected to an electric connecting device disposed in the housing when the bowl is introduced into said housing. This construction is intended to provide an appliance which is simple and reliable to use, presenting a bowl that is easily cleanable and whose heating performance is good.

The heating elements produced in the form of shielded heating elements have significant geometric variations, connected with the centering of the connecting terminals, the length of the heating element, or the manufacture of the heating element. These variations require the provision of a certain play of the bowl in the housing, in order to maintain on the electric connecting device openings provided for the introduction of the terminals of the heating element which are compatible with electrical safety standards. For a heating element having extreme geometric tolerances, there is a risk that the user will deform the terminals of the heating element or weaken the connector, by inserting the bowl into the housing while the terminals of the heating element are not opposite the connector openings. The consequence of a deformation of the terminals of the heating element can be destruction of the water tightness of the resistance. There will flow therefrom an entry of moisture into the electrical insulation of the heating element and thus an insulation failure. The consequence of a weakening of the connector can be the accessibility to the electrical parts capable of being at a voltage.

SUMMARY OF THE INVENTION

The present invention seeks to remedy the problems cited above and to furnish an electrical cooking appliance with a removable bowl under which is fixed a shielded heating element, which is reliable and simple to use.

Another object of the invention aims to provide an electrical cooking appliance with a removable bowl to which is fixed a shielded heating element, which has a reduced bulk.

The objects assigned to the invention are achieved with an electrical cooking appliance, notably a fryer, having a case forming a housing provided to receive a removable bowl, said bowl comprising lateral walls and a base under which is affixed a shielded heating element having two ends each terminating in a connection terminal, an electrical connector mounted in the case, said connector having electrical contacts disposed opposite openings provided to receive the terminals of the shielded heating element, during introduction of the bowl into the housing, characterized in that the connector is mounted to be movable in lateral translation relative to the base of the case and that the openings present bevel edges provided to guide the terminals of the heating element toward the electrical contacts.

Thus, during the introduction of the bowl into the housing, the terminal of the heating element arriving in contact with the bevel edge is guided into the openings by said bevel edge. If the bowl arrives in lateral abutment in the housing, the movably mounted connector is pushed by the terminal of the heating element cooperating with the bevel edge and said terminal can be inserted into the opening in a manner to establish the electrical connection.

Advantageously, the connector is movable in a direction substantially perpendicular to the planes defined by the direction of introduction of the bowl into the housing on the one hand and each of the extremities of the heating element on the other hand.

This arrangement permits in particular compensating for variations concerning the centering of the terminals of the heating element.

Preferably, the extremities of the heating element and the direction of introduction of the bowl into the housing are disposed substantially in the same plane.

This arrangement permits in particular correction for the variations concerning the length of the heating element.

Advantageously, the extremities of the heating element are inclined with respect to the direction of introduction of the bowl into the housing, by an angle greater than 30°.

This arrangement limits the opening angle formed by one of the terminals on the one hand and the base of the bowl on which the heating element is fixed on the other hand, and thus contributes to limiting the geometric variations of the terminals. This arrangement equally simplifies the construction of the shielded heating element since it avoids right-angle bends. In addition, the height necessary for the connection is limited which reduces the overall size of the device and correspondingly the dimensions of the appliance.

Advantageously, the connector has an upper face and a lateral perimeter, each opening being formed by an upper cutout arranged in the upper face and extended by a lateral cutout arranged in the lateral perimeter.

This arrangement permits an improvement in overall size since it allows for a lower position of the bowl in the case when the terminals of the heating element are inserted into the openings of the connector, than for a connector not having lateral cutouts.

In an advantageous manner, the bowl comprises a lug capable of being introduced into an opening of the connector and of cooperating with a connection tongue of the connector.

This lug can particularly extend directly from the bowl when the latter is fabricated by molding, or can even be added.

In a preferred manner, the connection tongues, the terminals of the heating element and the lug are arranged in a manner so that the lug is capable of entering into contact with the corresponding tongue before the terminals of the heating element enter into contact with their corresponding respective tongues.

This arrangement permits particularly grounding of the bowl before the heating element is supplied with electric power.

According to a preferred form of construction, the connector has lugs, preferably three in number, capable of sliding in oblong holes formed in a frame fixed to the case.

This simple construction permits assurance of guiding in a reliable manner.

According to another form of construction, the connector is coupled to the case by return travel means.

This arrangement permitting the connector to occupy a stable reference position improves the performance of the device. In effect, the width of the bevel edges can be reduced with respect to a construction not having return travel means, the stable position of the connector being able to be for example the median position with respect to the extreme positions capable of being occupied by the connector.

Advantageously, the connector is mounted to be mobile in two directions.

The connector can for example be maintained by three springs disposed in a star arrangement. This arrangement is particularly desirable when the terminals are not disposed in the same plane. In effect, the connector can effectuate a rotational movement, of small amplitude, during docking of the terminals of the heating element on the bevel edges of said connector.

BRIEF DESCRIPTION OF THE DRAWINGS

The invention will be better understood from a study of the forms of construction provided as non-limiting examples and illustrated in the attached figures in which.

BEST MANNER OF CONSTRUCTING THE INVENTION

Figure 1:
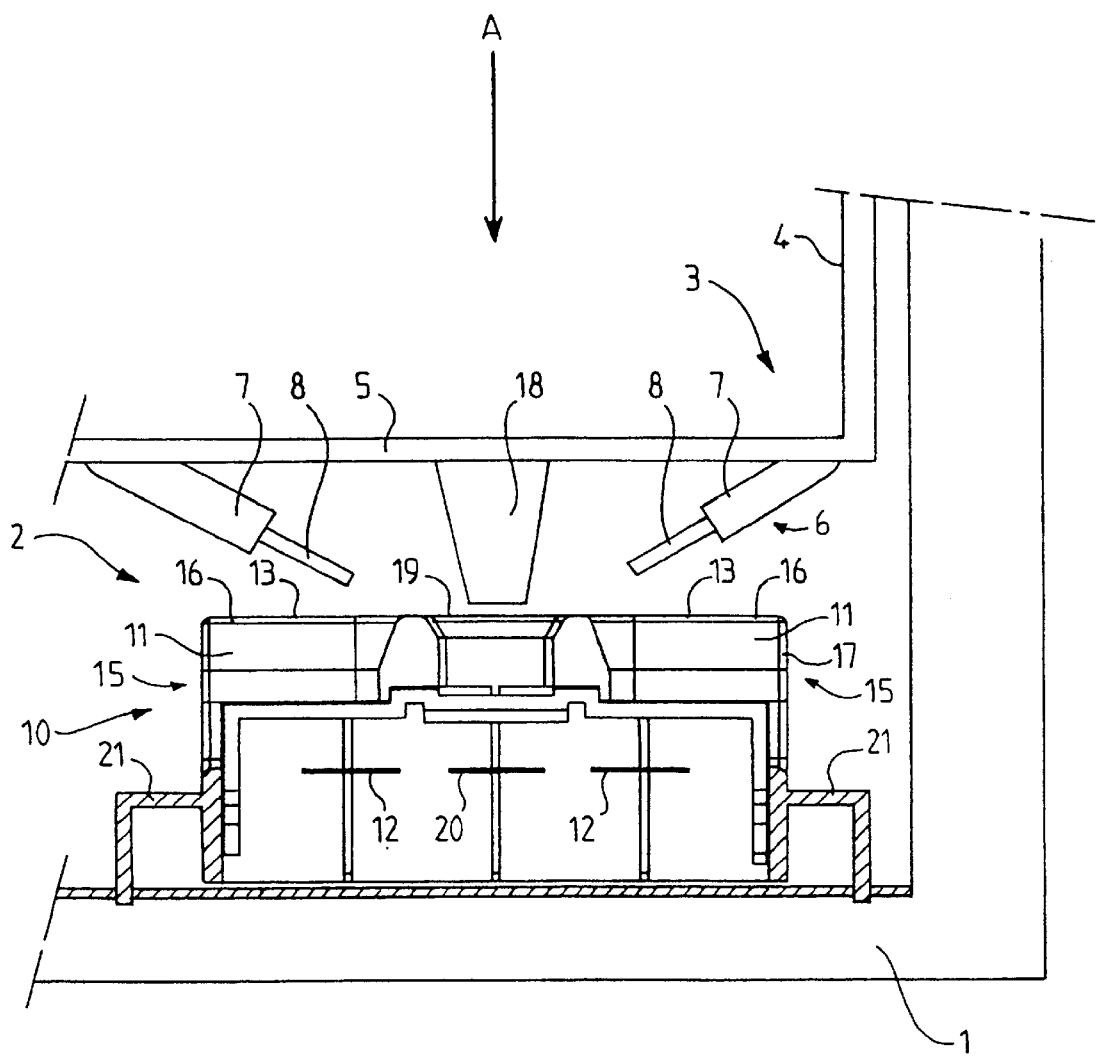
FIG. 1 is a partial schematic view in longitudinal cross section of an example of construction of an electrical cooking appliance according to the invention.

The electrical cooking appliance, particularly a fryer, shown in FIG. 1 includes a case 1 forming a housing 2 provided to receive a removable bowl 3. Bowl 3 comprises lateral walls 4 and a base 5 under which is fixed a shielded heating element 6. This heating element has in a known manner two extremities 7 each terminated by a connection terminal 8. An electrical connector 10 mounted in case 1 includes electrical contacts 12 disposed opposite openings 11 provided to receive terminals 8 of shielded heating element 6.

According to the invention, connector 10 is mounted to be movable in lateral translation with respect to the base of case 1 and openings 11 have bevel edges provided to guide terminals 8 of heating element 6 toward electrical contacts 12.

Advantageously, the connector is movable in a direction substantially perpendicular to the planes defined by the direction of introduction A of bowl 3 into housing 2 on the one hand and each of the extremities 7 of heating element 6 on the other hand.

Preferably, extremities 7 of heating element 6 and the direction of introduction A of bowl 3 into housing 7 are disposed substantially in the same plane.

Advantageously, extremities 7 of heating element 6 are inclined with respect to the direction of introduction of bowl 3 into housing 2, at an angle greater than 30° and for example such as shown in FIG. 1, at an angle of around 60°.

In an advantageous manner, connector 10 has an upper face 14 and a lateral perimeter 15, each opening 11 being formed by an upper cutout 16 arranged in the upper face 14 and extended by a lateral cutout 17 arranged in lateral perimeter 15, such as shown in FIG. 1.

Advantageously also, bowl 3 includes a lug 18 capable of being introduced into an opening 19 of connector 10 and of cooperating with a connection tongue 20 of connector 10. Lug 18 can be formed with bowl 3 when said bowl is molded, or even be added, for example on a stamped or thermo-welded bowl.

Preferably, connection tongues 12, 20, terminals 8 of heating element 6 and lug 18 are arranged in a manner such that lug 18 is capable of entering into contact with the corresponding tongue 20 before terminals 8 of heating element 6 enter into contact with their corresponding respective tongues 12.

Figure 2:
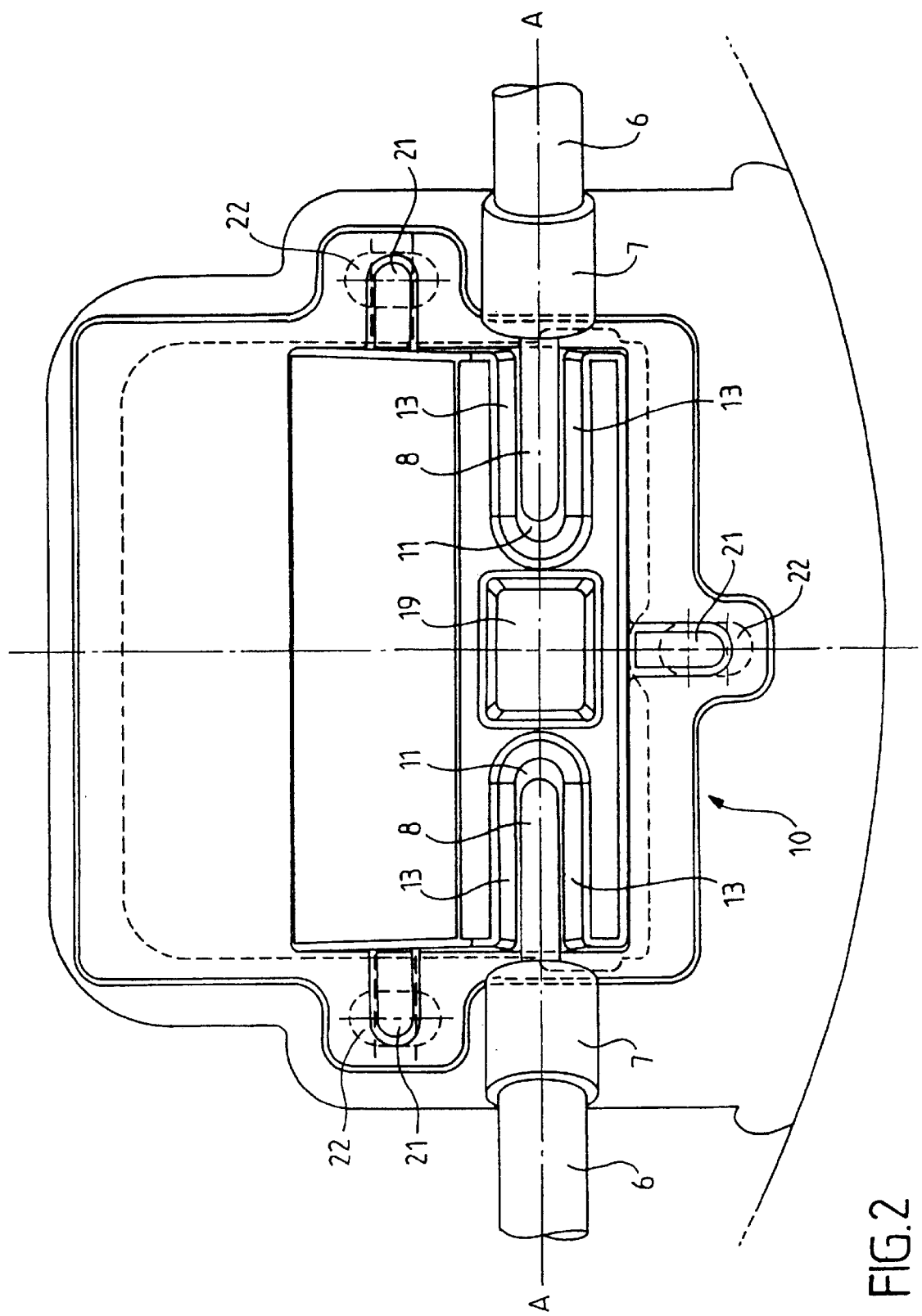
FIG. 2 is a schematic view from above of an element of the appliance shown in FIG. 1.
Figure 3:
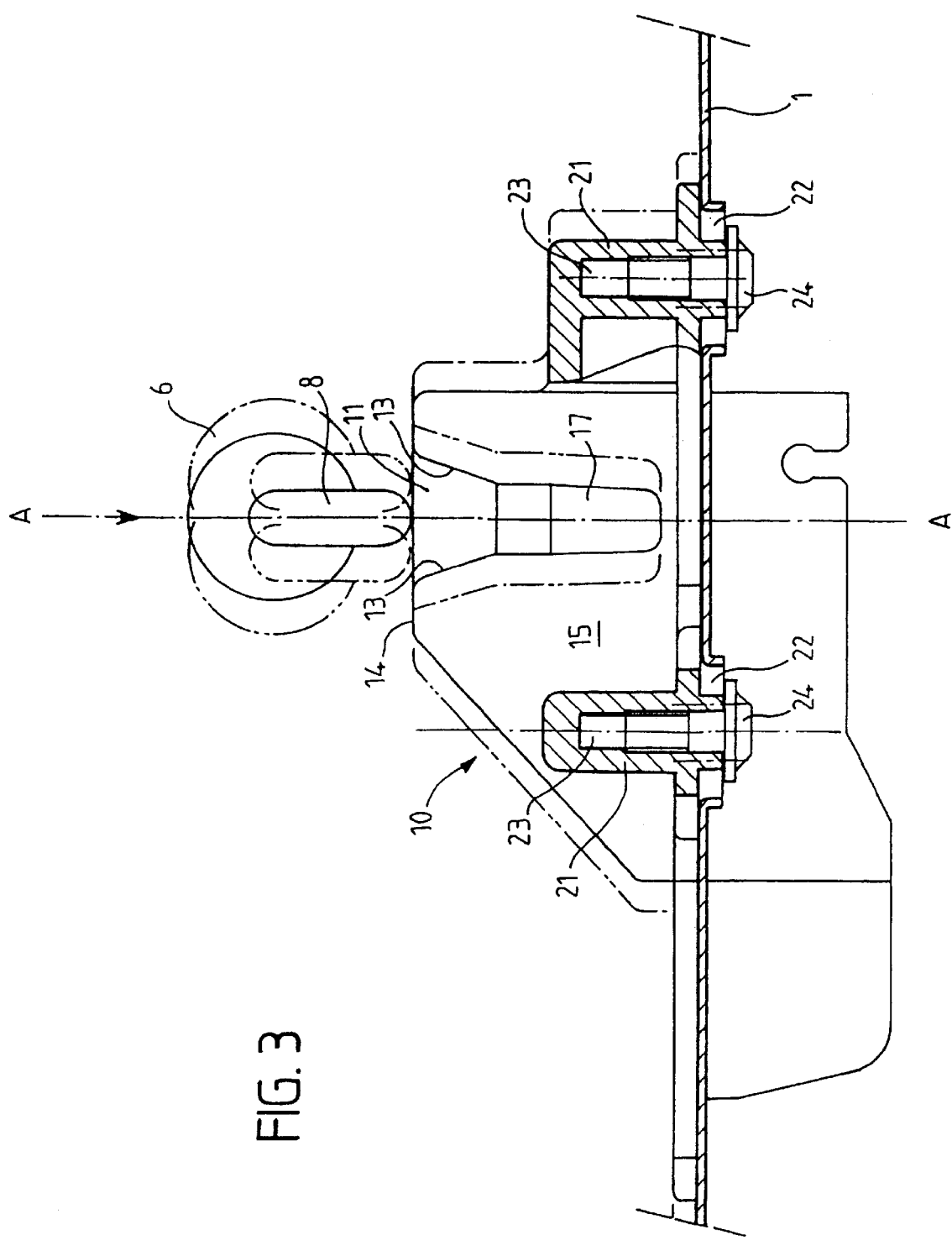
FIG. 3 is a schematic side view of this same element.

Connector 10 shown in FIGS. 2 and 3 has three lugs 21 able to slide in oblong holes 22 arranged in a frame 25 fixed to case 1. Each lug 21 has a central bore 23. A rivet 24 inserted into each of bores 23 permits connector 10 to be secured to frame 25.

According to another form of construction not shown in the figures, connector 10 is coupled to case 1 by return travel means. The return travel means can for example consist of two opposed springs provided to return the movable connector along a direction which is preferably perpendicular to the plane in which the connection terminals are disposed, the connector advantageously including at least one guiding aperture cooperating with a lug that is fixed to the case. The return travel means can also consist of three springs, disposed for example in a star at 120°. This arrangement permits obtaining an assembly in which the connector is movable along two directions, for example in a plane if the connector slides on a planar base of the case.

The appliance according to the invention is utilized in the following manner.

The user introduces bowl 3 into housing 2. During connection of shielded heating element 6 with electric connector 10, the terminal or terminals 8 can cooperate with the bevel edges 13, for example the cutouts 16 or 17 and displace connector 10 with respect to case 1. Terminals 8 are thus introduced naturally into openings 11 and come in contact with connection tongues 12.

The appliance thus permits achievement of the connection of heating element 6 to connector 10 in an automatic manner, by simple insertion of bowl 3 into housing 2 of case 1, without risk of weakening heating element 6 and/or connector 10.

Numerous improvements can be provided to this appliance in the framework of the claims.

POSSIBILITIES OF INDUSTRIAL APPLICATION

The invention finds its application in the technical field of electrical appliances for heating or cooking food.

What is claimed is:

1. Electrical cooking appliance, notably a fryer, having a case (1) forming a housing (2) provided to receive a removable bowl (3), said bowl comprising lateral walls (4) and a base (5) under which is fixed a shielded heating element (6) having two extremities (7) each terminated by a connection terminal (8), an electric connector (10) mounted in the case (1), said connector having electrical contacts (12) disposed opposite openings (11) provided to receive the terminals (8) of the shielded heating element (6), during introduction of the bowl (3) in the housing (2), characterized in that the connector (10) is mounted to be movable in lateral translation relative to the base of the case (1) and that the openings (11) have bevel edges (13) provided to guide the terminals (8) of the heating element (6) toward the electrical contacts (12).

2. Appliance according to claim 1 characterized in that the connector (10) is movable in a direction substantially perpendicular to the planes defined by the direction of introduction of the bowl (3) into the housing (2) and each of the extremities (7) of the heating element (6) on the other hand.

3. Appliance according to claim 2 characterized in that the extremities (7) of the heating element (6) and the direction of introduction of the bowl (3) into the housing (2) are disposed substantially in a same plane.

4. Appliance according to claim 1 characterized in that the extremities (7) of the heating element (6) are inclined with respect to the direction of introduction of the bowl (3) into the housing (2).

5. Appliance according to claim 1 characterized in that the connector (10) includes an upper face (14) and a lateral perimeter (15), each opening (11) being formed by an upper cutout (16) formed in the upper face (14) and prolonged by a lateral cutout (17) formed in the lateral perimeter (15).

6. Appliance according to claim 1 characterized in that the bowl (3) has a lug (18) capable of being introduced into an opening (19) of the connector (10) and of cooperating with a connection tongue (20) of the connector (10).

7. Appliance according to claim 6 characterized in that the connection tongues (12, 20), the terminals (8) of the heating element (6) and the lug (18) are arranged in a manner such that the lug (18) is capable of entering into contact with the corresponding tongue (20) before the terminals (8) of the heating element (6) enter into contact with their respective corresponding tongues (12).

8. Appliance according to claim 1 characterized in that the connector (10) has lugs (21), preferably three in number, capable of sliding in oblong holes (22) arranged in a frame (25) fixed to the case (1).

9. Appliance according to claim 1 characterized in that the connector (10) is connected to the case (1) by return travel means.

10. Appliance according to claim 9 characterized in that the connector (10) is mounted to be movable along two directions.

11. Appliance according to claim 1 wherein said connector is mounted to be movable in lateral translation in response to insertion of said removable bowl into said housing.

12. Appliance according to claim 11 wherein each of said openings has two beveled edges that spaced from one another in the direction of lateral translation movement of said connector.

13. Appliance according to claim 1 wherein each of said openings has two beveled edges that spaced from one another in the direction of lateral translation movement of said connector.

* * * * *